Oct. 7, 1924.
E. W. WILLIAMS
SHUT-OFF VALVE FOR PIPE FITTINGS
Filed April 29, 1924
1,510,813
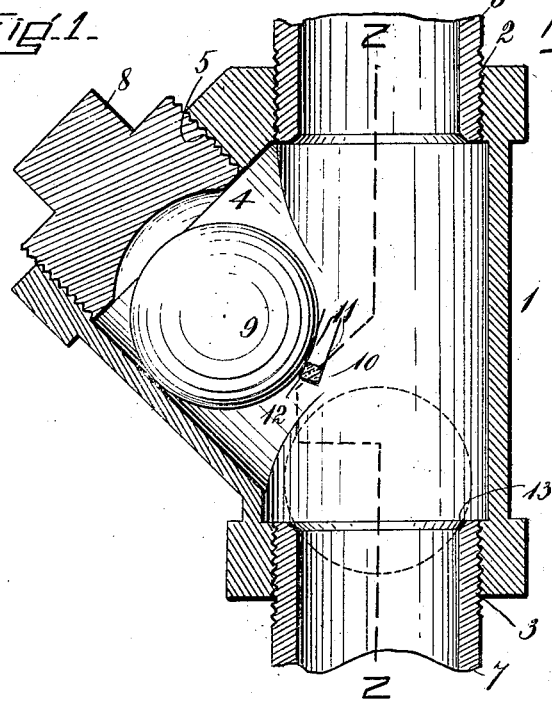
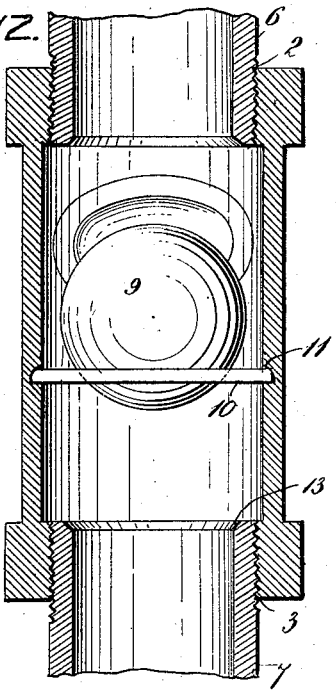
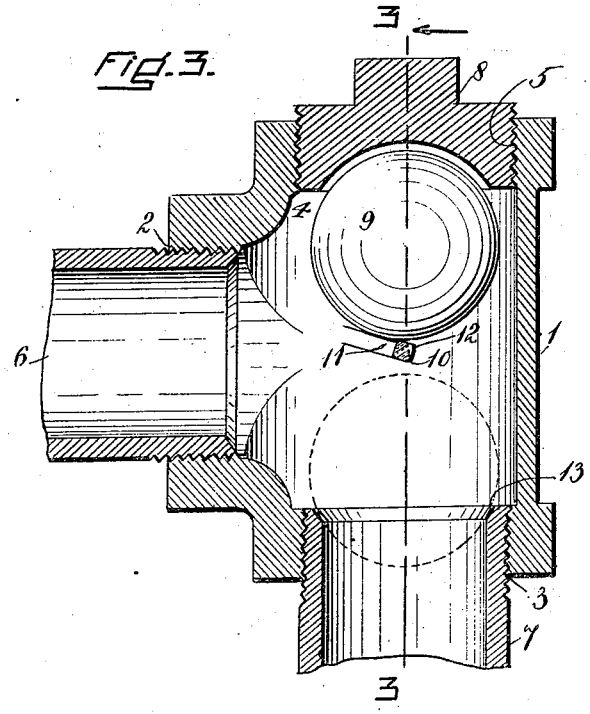
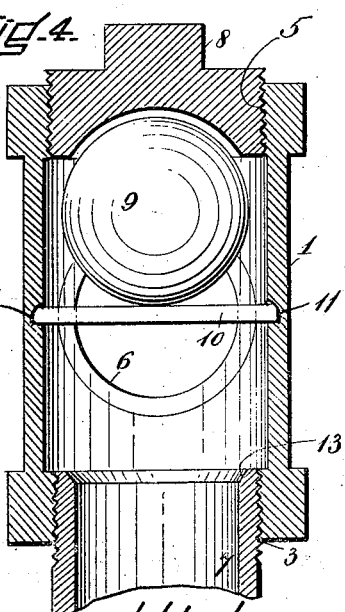
INVENTOR:
Ernest W. Williams
BY
ATTORNEYS:

Patented Oct. 7, 1924.

1,510,813

UNITED STATES PATENT OFFICE.

ERNEST W. WILLIAMS, OF LYNN, MASSACHUSETTS.

SHUT-OFF VALVE FOR PIPE FITTINGS.

Application filed April 29, 1924. Serial No. 709,776.

*To all whom it may concern:*

Be it known that I, ERNEST W. WILLIAMS, of Lynn, in the county of Essex and State of Massachusetts, a citizen of the United States, have invented a new and useful Improvement in Shut-Off Valves for Pipe Fittings, of which the following is a full, clear, and exact description, reference being had to the accompanying drawings, forming a part of this specification in explaining its nature.

The present invention relates to a shut-off valve for pipe fittings of that type in which the valve contained within a pipe fitting through which fluid is passed is normally maintained in an out-of-the-way position within the fitting, permitting of a free passage of the fluid therethrough, the maintenance of the valve being such that upon the application of heat to the fitting, as in case of fire, the valve will be released to become active for closing the passage through the fitting and thereby cut off a further passage of fluid therethrough.

The objects of the invention are essentially simplicity and economy of construction, adaptability of the valvular parts to any existing type of fitting where such type of shut-off can be used, easy application of the valvular parts to the fitting, both initially and when renewed, and maintenance of the valve in a positive manner when the valve is occupying its out-of-the-way position but equally positive when permitting of a release of the valve to become active in the event of fire.

The invention can best be seen and understood by reference to the drawings in which it is shown applied to different types of fittings illustrative of the adaptability of the invention, and in which—

Figure 1 is a vertical cross section showing the invention applied to a common type of Y pipe fitting.

Fig. 2 is a section on line 2—2 of Fig. 1.

Fig. 3 is a vertical cross section showing the application of the invention to a common type of T pipe fitting, and Fig. 4 is a section on line 3—3 of Fig. 3.

Referring to the drawings and first to Figs. 1 and 2 in which the valvular device is shown applied to the common Y type of pipe fitting:—

1 represents the body or shell of the fitting providing a valve casing. This casing has a passage therethrough with inlet and outlet openings 2 and 3, respectively, into and out of the casing and with a portion 4 of the chamber of the casing offset with relation to said passage above the outlet opening. The offset portion 4 has an opening 5 in the outer end thereof. A pipe section 6 has threaded connection with the inlet end of the casing and a pipe section 7 has threaded connection with the outlet end thereof. The opening 5 in the end of the offset is closed by a threaded cover or plug 8.

Located within the chamber of the offset is a ball valve 9 preferably a ball of steel or one having appreciable weight. This ball or valve is normally maintained in an out-of-the-way position within the chamber of the offset by a bar 10 of low-fusing metal. The bar itself is retained within the chamber of the fitting by the ends thereof resting on ledges 11 cut within the interior wall of the fitting, which effect may be accomplished by any suitable cutting tool, access being had to the interior wall of the fitting through any of its openings. In case the fitting is already applied in a pipe connection the ledges can readily be cut by access through the open end 5 of the offset. The ledges 11 are cut in places in the wall of the fitting opposite one another just below the ball when in its out-of-the-way position contained within the chamber of the offset. The fusible metal bar 10 spanning the space below the ball with the ends thereof resting upon the respective ledges, then operates to hold the ball resting thereon in its out-of-the-way position. I prefer that the ledges 11 cut within the walls of the fitting shall be cut on a slight incline in a direction away from the ball, and that the ledges present ends 12 in order that the weight of the ball shall maintain the ends of the fusible bar resting upon the ledges in contact with the ends 12 thereof securely in place.

In the event of fire or application of heat to the fitting, the fusing of the metal bar will release the valve or ball which will gravitate from the chamber of the offset through the chamber of the fitting and rest upon the top end of the outlet pipe section 7, which is preferably provided with a beveled edge 13 forming a seat for the valve. When the valve is occupying its position on this seat the passage through the fitting is entirely cut off and no fluid can pass therethrough.

In Figs. 3 and 4 the valve is shown applied to an ordinary type of T fitting, the general arrangement and operation being precisely as previously described and accordingly corresponding parts have been numbered the same as before.

Having thus fully described my invention, I claim and desire to secure by Letters Patent of the United States:—

1. A shut-off valve comprising a casing having a passage therethrough with inlet and outlet openings into and out of said casing and with a portion of the chamber of the casing offset with relation to said passage above the outlet opening, a ball valve normally received within said offset portion, means providing a seat for said valve whereby the passage through the casing is closed when the valve is engaging said seat, a fusible metal bar extending crosswise the interior of the casing below said valve when received within said offset portion as aforesaid and retained in a manner whereby it may then support said valve and upon the fusing of the bar permit the valve to gravitate and engage said seat, said casing being provided on the interior thereof with means for retaining the opposite ends of said bar.

2. A shut-off valve comprising a casing having a passage therethrough with inlet and outlet openings into and out of said casing and with a portion of the chamber of the casing offset with relation to said passage above the outlet opening, a ball valve normally received within said offset portion, means providing a seat for said valve whereby the passage through the casing is closed when the valve is engaging said seat, a fusible metal bar extending crosswise the interior of the casing below said valve when received within said offset portion as aforesaid and retained in a manner whereby it may then support said valve and upon the fusing of the bar permit the valve to gravitate and engage said seat, said casing being provided on the interior thereof with ledges cut in the wall of the casing and on which ledges the opposite ends of said bar are adapted to rest and be held in place by the weight of said valve.

ERNEST W. WILLIAMS.